United States Patent
Sode et al.

(10) Patent No.: US 10,593,956 B2
(45) Date of Patent: Mar. 17, 2020

(54) CARBON SHEET, GAS DIFFUSION ELECTRODE SUBSTRATE AND FUEL CELL

(71) Applicant: Toray Industries, Inc., Tokyo (JP)

(72) Inventors: Katsuya Sode, Otsu (JP); Takashi Chida, Otsu (JP); Masamichi Utsunomiya, Otsu (JP); Toru Sugahara, Otsu (JP); Takashi Ando, Otsu (JP)

(73) Assignee: Toray Industries, Inc., Tokyo (JP)

( * ) Notice: Subject to any disclaimer, the term of this patent is extended or adjusted under 35 U.S.C. 154(b) by 223 days.

(21) Appl. No.: 15/519,243

(22) PCT Filed: Oct. 7, 2015

(86) PCT No.: PCT/JP2015/078493
§ 371 (c)(1),
(2) Date: Apr. 14, 2017

(87) PCT Pub. No.: WO2016/060044
PCT Pub. Date: Apr. 21, 2016

(65) Prior Publication Data
US 2017/0244108 A1    Aug. 24, 2017

(30) Foreign Application Priority Data

Oct. 17, 2014  (JP) .................. 2014-212423

(51) Int. Cl.
*H01M 4/88* (2006.01)
*H01M 4/96* (2006.01)
(Continued)

(52) U.S. Cl.
CPC ....... *H01M 4/8807* (2013.01); *H01M 4/8605* (2013.01); *H01M 4/8657* (2013.01);
(Continued)

(58) Field of Classification Search
CPC ....... H01M 2008/1095; H01M 4/8605; H01M 4/8657; H01M 4/8807; H01M 4/881; H01M 4/96; H01M 8/0234; H01M 8/0245
See application file for complete search history.

(56) References Cited

U.S. PATENT DOCUMENTS

| 2007/0015042 A1* | 1/2007 | Ji ............................. B32B 3/30 |
| | | 429/509 |
| 2013/0017390 A1* | 1/2013 | Cote ..................... B01D 53/02 |
| | | 428/315.5 |

FOREIGN PATENT DOCUMENTS

| JP | 2006-324104 A | 11/2006 |
| JP | 2007-176750 A | 7/2007 |

(Continued)

*Primary Examiner* — Stewart A Fraser
*Assistant Examiner* — Victoria H Lynch
(74) *Attorney, Agent, or Firm* — DLA Piper LLP (US)

(57) ABSTRACT

A porous carbon sheet contains carbon fiber and a binder, wherein the carbon sheet is characterized in that in a section from a plane having a 50% filling ratio closest to one surface to a plane having a 50% filling ratio closest to the other surface, when letting layer X be a layer with the largest filling ratio close to the one surface, layer Y be a layer with a filling ratio smaller than layer X close to the other surface, and layer Z be the layer positioned between layer X and layer Y for layers obtained by dividing the carbon sheet equally into three in a direction perpendicular to the surfaces, the filling ratio for the layers becomes smaller in order of layer X, layer Y, and layer Z.

17 Claims, 3 Drawing Sheets

(51) Int. Cl.
*H01M 4/86* (2006.01)
*H01M 8/0245* (2016.01)
*H01M 8/0234* (2016.01)
*H01M 8/1018* (2016.01)

(52) U.S. Cl.
CPC .............. *H01M 4/881* (2013.01); *H01M 4/96* (2013.01); *H01M 8/0234* (2013.01); *H01M 8/0245* (2013.01); H01M 2008/1095 (2013.01); Y02P 70/56 (2015.11)

(56) References Cited

FOREIGN PATENT DOCUMENTS

| | | |
|---|---|---|
| JP | 2009-70637 A | 4/2009 |
| JP | 2009-176610 A | 8/2009 |
| JP | 2013-145640 A | 7/2013 |

* cited by examiner

CARBON SHEET, GAS DIFFUSION ELECTRODE SUBSTRATE AND FUEL CELL

TECHNICAL FIELD

This disclosure relates to a carbon sheet suitably used in a fuel cell, particularly in a polymer electrolyte fuel cell; a gas diffusion electrode substrate; and a fuel cell including the gas diffusion electrode substrate.

BACKGROUND

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted of laminating a bipolar plate, a gas diffusion electrode substrate, a catalyst layer, an electrolyte membrane, a catalyst layer, a gas diffusion electrode substrate and a bipolar plate in this order. The gas diffusion electrode substrate is required to have high gas diffusivity to allow a gas supplied from the bipolar plate to be diffused into a catalyst layer and high water removal performance to discharge water generated by the electrochemical reaction to the bipolar plate, as well as high electrical conductivity to extract generated electric current. Thus, gas diffusion electrode substrates are widely used in which a microporous layer is formed on a surface of a substrate that is a carbon sheet composed of a carbon fiber or the like.

However, as problems of such gas diffusion electrode substrates, the following problems are known: (1) when the polymer electrolyte fuel cell is operated at a relatively low temperature of below 70° C. in a high current density region, as a result of blockage of the gas diffusion electrode substrate by liquid water generated in a large amount and shortage in the gas supply, the fuel cell performance is impaired (this problem is hereinafter referred to as "flooding"); and (2) at the time when the gas diffusion electrode substrate is pressed against a bipolar plate in assembly of the polymer electrolyte fuel cell, the gas diffusion electrode substrate bends into a flow channel of a bipolar plate which is engaged in supply of a gas and discharge of generated water so that supply of a gas is hindered, and discharge of generated water from a gas flow channel. Thus, the gas diffusion electrode substrate is required to have mechanical strength required for a gas diffusion electrode substrate while exhibiting high generated water removal performance, and low-bending property such that the gas diffusion electrode substrate is not deformed to a gas flow channel when locally compressed.

For example, there has been proposed a carbon sheet in which to reduce compressive residual strain of a surface of the carbon sheet to suppress bending into a channel provided on a bipolar plate, layers having different bulk densities are laminated in a through-plane direction so that the porous structures of both surfaces each have a density higher than the bulk density of the porous structure of the inner part (Japanese Patent Laid-open Publication No. 2007-176750).

There has been proposed a fuel cell gas diffusion substrate in which the resin density of a carbon sheet is continuously decreased in a through-plane direction to prevent deterioration of performance of the fuel cell (Japanese Patent Laid-open Publication No. 2013-145640).

However, Japanese Patent Laid-open Publication No. 2007-176750 still has the problem that since the bulk densities of both surfaces of the carbon sheet are equivalent to each other, water, when generated, is easily retained in the inner part so that marked flooding occurs.

Japanese Patent Laid-open Publication No. 2013-145640 still has the problem that since the amount of a carbonized resin on the bipolar plate side decreases, not only bending of a carbon sheet into a bipolar plate flow channel increases, but also binding of a carbon fiber on a surface is loosened so that the carbon fiber fluffs in the bipolar plate, intercepts generated water in the flow channel, and blocks the flow channel.

Thus, it could be helpful to provide a carbon sheet suitable for use in a gas diffusion electrode substrate having an excellent anti-flooding characteristic that has been heretofore difficult to achieve, and that can be prevented from bending into a gas flow channel.

It could also be helpful to provide a gas diffusion electrode substrate obtained using the carbon sheet as a substrate, and a fuel cell including the gas diffusion electrode.

SUMMARY

We thus provide a porous carbon sheet including a carbon fiber and a binding material, wherein
when among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to one surface and has the largest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z.

The 50% filling rate is a value of 50% of an average value obtained in the following manner: the filling rate of the surface is measured every fixed length from one surface to the other surface of the carbon sheet and, subsequently, an average value of the obtained filling rates of the surfaces is determined.

Further, the filling rate of a layer is an average value obtained using the filling rates of the surfaces that form the layer.

We also provide a porous carbon sheet including a carbon fiber and a binding material, wherein
when layers obtained by dividing the carbon sheet in a through-plane direction into six equal parts under compression within a section extending from a surface to the other surface include a layer 1, a layer 2, a layer 3, a layer 4, a layer 5 and a layer 6 in this order from the layer including one surface to the layer including the other surface, a layer having the largest filling rate under compression is the layer 2, and
the filling rates of the layer 2, the layer 3, the layer 4 and the layer 5 under compression satisfy the relationship of: filling rate of layer 2>filling rate of layer 5>average of filling rates of layer 3 and layer 4.

A carbon sheet suitable for use in a gas diffusion electrode substrate having an excellent anti-flooding characteristic that has been heretofore difficult to achieve, and that can be prevented from bending into a gas flow channel can be obtained.

DESCRIPTION OF REFERENCE SIGNS

Figure 1:
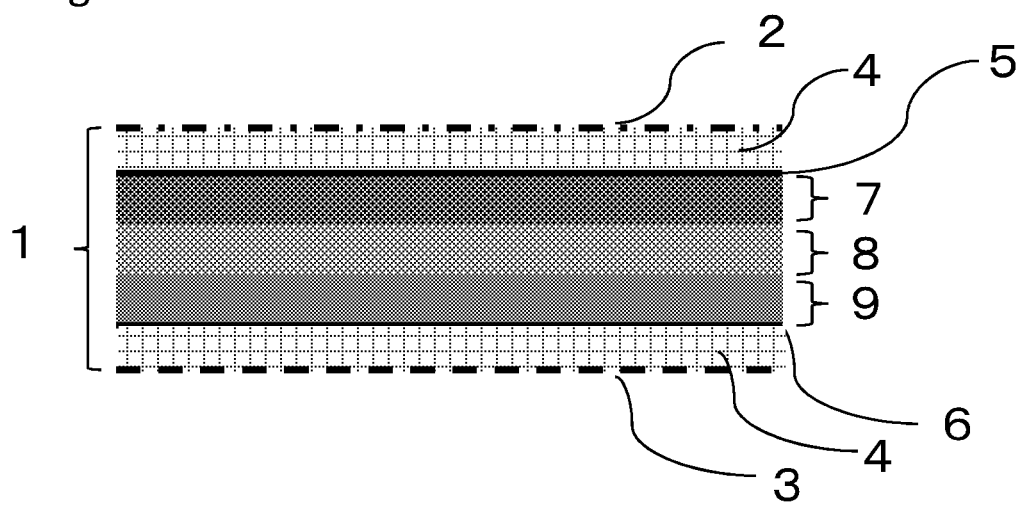
FIG. 1 is a schematic sectional view explaining a configuration of a carbon sheet according to a first example.

1: Carbon sheet
2: Surface X
3: Surface Y
4: Region composed of surface having filling rate less than 50% filling rate
5: Surface XX
6: Surface YY
7: Layer X
8: Layer Z
9: Layer Y
10: Surface 1
11: Surface 6
12: Layer 1
13: Layer 2
14: Layer 3
15: Layer 4
16: Layer 5
17: Layer 6
18: Microporous layer
19: Gas diffusion electrode substrate

DETAILED DESCRIPTION

A first configuration is a porous carbon sheet including a carbon fiber and a binding material, wherein when among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to one surface and has the largest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z. The 50% filling rate is a value of 50% of an average value obtained in the following manner: the filling rate of the surface is measured every fixed length from one surface to the other surface of the carbon sheet and, subsequently, an average value of the obtained filling rates of the surfaces is determined. Further, the filling rate of a layer is an average value obtained using the filling rates of the surfaces that form the layer.

A second configuration is a porous carbon sheet including a carbon fiber and a binding material, wherein when layers obtained by dividing the carbon sheet in a through-plane direction into six equal parts under compression within a section extending from a surface to the other surface include a layer 1, a layer 2, a layer 3, a layer 4, a layer 5 and a layer 6 in this order from the layer including one surface to the layer including the other surface, a layer having the largest filling rate under compression is the layer 2, and the filling rates of the layer 2, the layer 3, the layer 4 and the layer 5 under compression satisfy the relationship of: filling rate of layer 2>filling rate of layer 5>average of filling rates of layer 3 and layer 4.

For the layer 1, the layer 2, the layer 3, the layer 4, the layer 5 and the layer 6, the filling rate represents a filling rate under compression even when simply described as a "filling rate". In other words, the "filling rate of the layer 1" and the "filling rate of the layer 1 under compression" both represent a filling rate of the layer 1 under compression.

Hereinafter, the carbon sheet, a gas diffusion electrode substrate and a fuel cell will be described in detail.

Figure 2:
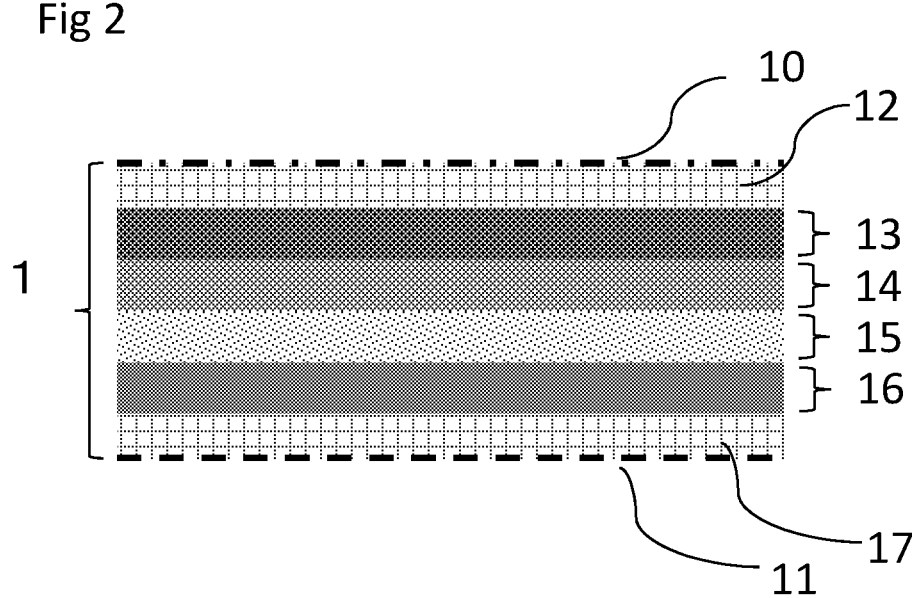
FIG. 2 is a schematic sectional view explaining a configuration of a carbon sheet according to a second example.
Figure 3:
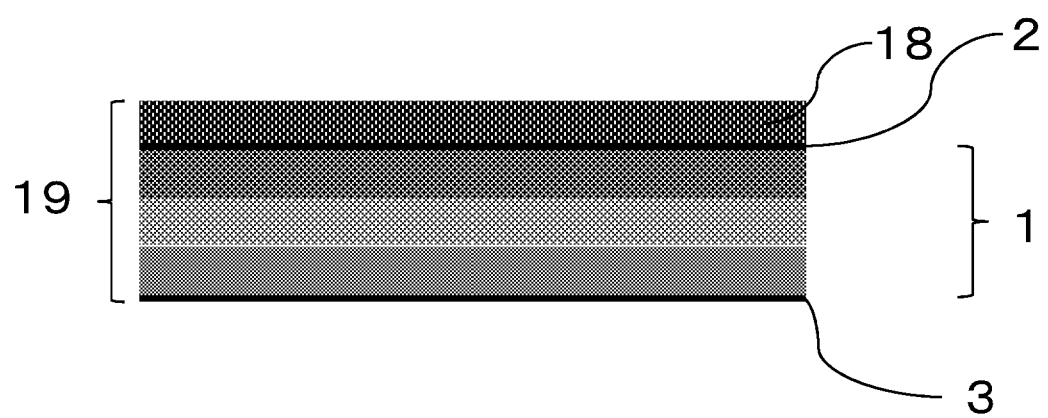
FIG. 3 is a schematic sectional view explaining a configuration of a gas diffusion electrode substrate obtained using the carbon sheet.

First, the configurations of the carbon sheet and the gas diffusion electrode substrate will be described with reference to the drawings. FIG. 1 is a schematic view explaining a configuration of a carbon sheet according to a first example. FIG. 2 is a schematic sectional view explaining a configuration of a carbon sheet according to a second example. FIG. 3 is a schematic sectional view illustratively explaining a configuration of a gas diffusion electrode substrate obtained using the carbon sheet according to the first example.

In FIG. 1, when among layers obtained by dividing the carbon sheet in a through-plane direction into three equal parts within a section extending from a surface (surface XX(5)) having a 50% filling rate, which is closest to one surface (surface X(2)), to a surface (surface YY(6)) having a 50% filling rate, which is closest to the other surface (surface Y(3)), a layer which is close to one surface (surface X(2)) and has the largest layer filling rate is a layer X(7), a layer which is close to the other surface (surface Y(3)) and has a layer filling rate smaller than that of the layer X is a layer Y(9), and a layer situated between the layer X and the layer Y is a layer Z(8), the filling rate decreases in the order of the layer X(7), the layer Y(9) and the layer Z(8). Thus, a carbon sheet (1) according to the first example includes the layer X(7), the layer Y(9), the layer Z(8), and a region (4) including a surface having a filling rate less than the 50% filling rate.

In FIG. 2, where layers obtained by dividing the carbon sheet in a through-plane direction into six equal parts under compression within a section extending from one surface (surface 1(10)) to the other surface (surface 6(11)) include a layer 1(12), a layer 2(13), a layer 3(14), a layer 4(15), a layer 5(16) and a layer 6(17) in this order from the layer including one surface (surface 1(10)) to the layer including the other surface (surface 6(11)), a layer having the largest filling rate under compression is the layer 2(13), and the filling rates of the layer 2(13), the layer 3(14), the layer 4(15) and the layer 5(16) under compression satisfy the relationship of: filling rate of layer 2(13)>filling rate of layer 5(16)>average of filling rates of layer 3(14) and layer 4(15). Thus, the carbon sheet (1) according to the second example includes the layer 1(12), the layer 2(13), the layer 3(14), the layer 4(15), the layer 5(16) and the layer 6(17).

FIG. 3 illustrates a configuration of a gas diffusion electrode substrate (19) that can be obtained by forming a microporous layer (18) on the surface X(2) being one surface of the carbon sheet (1) in FIG. 1. The microporous layer (18) can be structured to be partially filled into the carbon sheet (1).

Carbon Sheet

The carbon sheet is a porous carbon sheet including a carbon fiber and a binding material, and can be subjected to a hydrophobic treatment as necessary.

The binding material represents components other than the carbon fiber in the carbon sheet. Thus, the binding material includes a carbide of a resin composition that is a material serving to bind carbon fibers. When a hydrophobic material is used in the carbon sheet, the hydrophobic material is included in the binding material.

It is important that the carbon sheet is porous to exhibit high gas diffusivity to allow a gas supplied from a bipolar plate to be diffused into a catalyst layer and high water removal performance to discharge water generated by an electrochemical reaction to the bipolar plate. Further, it is preferred that the carbon sheet has high electrical conductivity to extract generated electric current. Thus, to obtain a carbon sheet, a porous material having electrical conductivity is preferably used. More specifically, as the porous material to be used to obtain a carbon sheet, for example, a porous material including a carbon fiber such as a carbon fiber woven material, a carbon paper or a carbon fiber nonwoven fabric, or a carbonaceous foamed porous material including a carbon fiber is preferably used.

In particular, to obtain a carbon sheet, a porous material including a carbon fiber is preferably used because of its excellent corrosion resistance and, further, a carbon paper obtained by binding a carbon fiber papermaking substrate to a carbide (binding material) is preferably used because it is excellent in property of absorbing a change in dimension of an electrolyte membrane in a through-plane direction (thickness direction), i.e. "spring property".

The first example of the carbon sheet is a carbon sheet in which among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to one surface and has the highest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z. The 50% filling rate is a value of 50% of an average value obtained in the following manner: the filling rate of the surface is measured every fixed length from one surface to the other surface of the carbon sheet, and an average value of the obtained filling rates is determined. Further, the filling rate of a layer is an average value obtained using the filling rates of the surfaces that form the layer.

Since the filling rate of the layer Z is lower than that of each of the other two layers, pores existing in the layer Z have a large diameter. Accordingly, diffusion of a gas and discharge of water can be effectively performed. Since the filling rate of the layer Y is lower than the filling rate of the layer X, water generated in the layer Z due to electrical power generation is quickly discharged to the layer Y having pores larger in diameter than pores in the layer X, and hence a sparse structure. Thus, the anti-flooding characteristic can be improved. Meanwhile, since the layer Y has a filling rate higher than that of the layer Z, the layer Y has a rigid flat surface and, therefore, does not bend when a bipolar plate is pressed against the carbon sheet. It is possible to attain an anti-flooding characteristic and prevent bending of the bipolar plate surface by arranging the layers such that the filling rate of the layer decreases in the order of the layer X, the layer Y and the layer Z as described above.

The second example is a porous carbon sheet including a carbon fiber and a binding material, wherein when layers obtained by dividing the carbon sheet in a through-plane direction into six equal parts under compression within a section extending from a surface to the other surface include a layer 1, a layer 2, a layer 3, a layer 4, a layer 5 and a layer 6 in this order from the layer including one surface to the layer including the other surface, a layer having the largest filling rate under compression is the layer 2, and the filling rates of the layer 2, the layer 3, the layer 4 and the layer 5 under compression satisfy the relationship of: filling rate of layer 2>filling rate of layer 5>average of filling rates of layer 3 and layer 4.

Since the average of the filling rates of the layer 3 and the layer 4 is lower than that of each of the other two layers, pores existing in the layer 3 and the layer 4 have a large diameter. Accordingly, diffusion of a gas and discharge of water can be effectively performed. Since the filling rate of the layer 5 is lower than the filling rate of the layer 2, water generated in the layer 3 and the layer 4 due to electrical power generation is quickly discharged to the layer 5 having pores larger in diameter than pores in the layer 2, and hence a sparse structure. Thus, the anti-flooding characteristic can be improved. Meanwhile, since the layer 5 has a filling rate higher than the average of the filling rates of the layer 3 and the layer 4, the layer 5 has a rigid flat surface and, therefore, does not bend when a bipolar plate is pressed against the carbon sheet. It is possible to attain an anti-flooding characteristic and prevent bending of the bipolar plate surface by arranging the layers such that the filling rate of the layer decreases in the order of the layer 2, the layer 5 and the average between the layer 3 and the layer 4 as described above.

The carbon sheet in which the filling rate of the layer decreases in the order of the layer X, the layer Y and the layer Z, or in the order of the layer 2, the layer 5 and the average between the layer 3 and the layer 4 is obtained by a method of controlling in a through-plane direction (thickness direction) the mean diameter of monofilaments of a carbon fiber that forms the carbon sheet, the density of the carbon sheet, or the distribution of a binding material, but it is more preferred to control the distribution of a binding material.

The method of controlling the distribution of a binding material in a through-plane direction may be a method in which three prepregs that are each obtained by impregnating a resin composition into a porous material such as a carbon fiber papermaking substrate prepared by a method as described below and that are different in amount of the impregnated resin composition, and laminated and molded, and carbonized to obtain a carbon sheet, or a method in which one prepreg made to have a distribution in the loading amount of resin by using a resin addition method in which a distribution is formed in the loading amount of a resin composition in impregnation of the resin composition into a porous material such as a carbon fiber papermaking substrate is provided, and molded without being laminated, and is carbonized to obtain a carbon sheet. When the carbon sheet is obtained by the method in which prepregs different in amount of the impregnated resin composition are laminated, a rapid change in filling rate occurs at the lamination interface so that generated water is easily retained at the interface without being smoothly discharged and, therefore, of the above-mentioned methods, the method in which the carbon sheet is prepared from one prepreg is preferred because such a rapid change in filling rate does not occur. The method in which the carbon sheet is prepared from one prepreg rather than laminating a plurality of prepregs facilitates reduction of the thickness of the resulting carbon sheet, and is therefore suitable for adjusting the thickness to fall within a preferred range.

In the first example, the filling rate of the layer to attain an anti-flooding characteristic and prevent bending is preferably such that when the filling rate of the layer Y is 1, the filling rate of the layer X is 1.03 or more, and the filling rate of the layer Z is 0.97 or less. The filling rate of each layer when the filling rate of the layer Y is 1 is hereinafter a filling rate ratio of each layer.

When the filling rate of the layer Y is 1, the filling rate of the layer Z is more preferably 0.8 or less, further preferably 0.7 or less. Reduction of the filling rate of the layer Z remarkably improves diffusivity of a gas in the carbon sheet and removal performance of water generated in the carbon sheet so that a good anti-flooding characteristic is obtained. The filling rate ratio of the layer Z is not particularly limited, but it is preferably 0.14 or more when considering strength required in use of the carbon sheet in post-processing and stacking of fuel cells.

When the filling rate of the layer Y is 1, the filling rate of the layer X is more preferably 1.05 or more, further preferably 1.1 or more. When the filling rate of the layer Y is 1, the filling rate of the layer X is 1.05 or more, water generated in the layer Z situated between the layer X and the layer Y is easily discharged to the layer Y having a sparse structure. The upper limit of the filling rate ratio of the layer X is not particularly limited, but it is preferably 7.0 or less from the viewpoint of fuel cell performance.

When the filling rate of each of the layer X, the layer Y and the layer Z is 5 to 35%, the carbon sheet is well balanced in mechanical strength required to use the carbon sheet as a fuel cell gas diffusion electrode substrate, which is preferred. When the filling rate of each of the layer X, the layer Y and the layer Z is 5% or more, the carbon sheet is inhibited from being ruptured by a force received from a bipolar plate in assembly of a fuel cell stack, and handling characteristics in production and high-order processing of the carbon sheet are improved. When the filling rate of each of the layer X, the layer Y and the layer Z is 35% or less, migration of substances in the carbon sheet is facilitated, diffusion of a gas and discharge of generated water are efficiently performed, and fuel cell performance of a fuel cell is remarkably improved. The filling rate of the layer X is more preferably 10 to 30%, further preferably 12 to 20%. The filling rate of the layer Y is more preferably 8 to 25%, further preferably 10 to 20%. The filling rate of the layer Z is more preferably 5 to 20%, further preferably 7 to 15%. When the filling rate of each of the layer X, the layer Y and the layer Z is in a preferred range, both optimum mechanical strength and optimum fuel cell performance can be achieved.

Preferably, the carbon sheet according to the first example is a carbon sheet in which where layers obtained by dividing the carbon sheet in a through-plane direction into six equal parts under compression within a section extending from a surface to the other surface include a layer 1, a layer 2, a layer 3, a layer 4, a layer 5 and a layer 6 in this order from the layer including one surface to the layer including the other surface, a layer having the largest filling rate under compression is the layer 2, and the filling rates of the layer 2, the layer 3, the layer 4 and the layer 5 under compression satisfy the relationship of: filling rate of layer 2>filling rate of layer 5>average of filling rates of layer 3 and layer 4.

In the carbon sheet according to the first example, it is preferred that when the filling rate of the layer 5 is 1, the filling rate of the layer 2 is 1.03 or more, and the average of the filling rates of the layer 3 and the layer 4 is 0.97 or less.

In a preferred aspect, the filling rate of the layer 2, the filling rate of the layer 5 and the average of the filling rates of the layer 3 and the layer 4 in the first example are the same as the filling rate of the layer 2, the filling rate of the layer 5 and the average of the filling rates of the layer 3 and the layer 4 in the second example described below.

In the second example, the filling rate of the layer under compression to attain an anti-flooding characteristic and prevent bending is preferably such that when the filling rate of the layer 5 is 1, the filling rate of the layer 2 is 1.03 or more, and the average of the filling rates of the layer 3 and the layer 4 is 0.97 or less. The filling rate of each layer when the filling rate of the layer 5 is 1 is hereinafter a filling rate ratio of each layer.

When the filling rate of the layer 5 is 1, the average of the filling rates of the layer 3 and the layer 4 is more preferably 0.8 or less, further preferably 0.7 or less. Reduction of the average of the filling rates of the layer 3 and the layer 4 remarkably improves diffusivity of a gas in the carbon sheet and removal performance of water generated in the carbon sheet so that a good anti-flooding characteristic is obtained. The average of the filling rate ratios of the layer 3 and the layer 4 is not particularly limited, but it is preferably 0.14 or more when considering strength required in use of the carbon sheet in post-processing and stacking of fuel cells.

When the filling rate of the layer 5 is 1, the filling rate of the layer 2 is more preferably 1.05 or more, further preferably 1.1 or more. When the filling rate of the layer 5 is 1, the filling rate of the layer 2 is 1.05 or more, water generated in the layer 3 and the layer 4 situated between the layer 2 and the layer 5 is easily discharged to the layer 5 having a sparse structure. The upper limit of the filling rate ratio of the layer 2 is not particularly limited, but it is preferably 7.0 or less from the viewpoint of fuel cell performance.

In the second example, when each of the filling rate of the layer 2, the filling rate of the layer 5 and the average of the filling rates of the layer 3 and the layer 4 is 10 to 40%, the carbon sheet is well balanced in mechanical strength required to use the carbon sheet as a fuel cell gas diffusion electrode substrate, which is preferred. When each of the filling rate of the layer 2, the filling rate of the layer 5 and the average of the filling rates of the layer 3 and the layer 4 is 5% or more, the carbon sheet is inhibited from being ruptured by a force received from a bipolar plate in assembly of a fuel cell stack, and handling characteristics in production and high-order processing of the carbon sheet are improved. When each of the filling rate of the layer 2, the filling rate of the layer 5 and the average of the filling rates of the layer 3 and the layer 4 is 35% or less, migration of substances in the carbon sheet is facilitated, diffusion of a gas and discharge of generated water are efficiently performed, and fuel cell performance of a fuel cell is remarkably improved. The filling rate of the layer 2 is more preferably 20 to 35%, further preferably 17 to 28%. The filling rate of the layer 5 is more preferably 13 to 30%, further preferably 15 to 25%. The average of the filling rates of the layer 3 and the layer 4 is more preferably 10 to 25%, further preferably 15 to 20%. When each of the filling rate of the layer 2, the filling rate of the layer 5 and the average of the filling rates of the layer 3 and the layer 4 is in a preferred range, both optimum mechanical strength and optimum fuel cell performance can be achieved.

The thickness of the carbon sheet is preferably 50 μm or more and 200 μm or less, further preferably 90 μm or more and 190 μm or less. When the carbon sheet has a small thickness of 200 μm or less, gas diffusivity is enhanced, and generated water is easily discharged. Further, the size of a fuel cell as a whole decreases, which is preferred. Meanwhile, the thickness of the carbon sheet is preferably 50 μm or more. This is because when the thickness of the carbon sheet is 50 μm or more, gas diffusion in a plane direction in the carbon sheet is efficiently performed, and fuel cell performance is easily improved.

The density of the carbon sheet is preferably 0.2 to 0.4 g/m$^3$, more preferably 0.22 to 0.35 g/m$^3$. When the density is 0.2 g/cm$^3$ or more, the mechanical properties of the carbon sheet are improved so that the electrolyte membrane and the catalyst layer can be sufficiently supported. In addition, high electrical conductivity is attained, and the fuel cell performance is thus improved. Meanwhile, when the density is 0.4 g/cm³ or less, water removal performance is improved, and flooding can thus be suppressed.

A carbon sheet having a density as described above can be obtained by controlling the areal weight of the carbon fiber, the loading amount of the resin component based on the amount of the carbon fiber, and the thickness of the carbon sheet as described below in a method of producing a carbon sheet. The density of the carbon sheet can be determined by dividing the areal weight (mass per unit area), which is measured using an electronic balance, by the thickness of the carbon sheet in a state of being compressed at a pressure of 0.15 MPa. The binding material is a material that serves to bind carbon fibers, and examples thereof include resin compositions and carbides thereof.

When the sum of the volumes of pores having a diameter of 1 to 100 μm is 100%, the sum of the volumes of pores having a diameter of 50 to 100 μm (hereinafter, described as a volume ratio of pores with a diameter of 50 to 100 μm) is 17 to 50%, water removal performance is particularly improved, and a high anti-flooding characteristic is exhibited, which is preferred. Pores having a diameter of 50 to 100 μm have an important role in control of water and water vapor during electrical power generation. The ratio of large pores with a diameter in the above-mentioned range is also associated with uniformity of the carbon sheet with respect to formation unevenness or the like. When the sum of the volumes of pores having a diameter of 1 to 100 μm is 100%, the volume ratio of pores with a diameter of 50 to 100 μm is 17% or more, water removal performance is improved so that flooding can be suppressed. When the volume ratio of pores with a diameter of 50 to 100 μm is 50% or less, a carbon sheet formed by papermaking or the like can be made free from formation unevenness or the like, and uniformly prepared and, therefore, mechanical properties such as tensile strength can be improved. The volume ratio of pores with a diameter of 50 to 100 μm can be set to 17 to 50% by using, for example, a carbon fiber in which the ratio of the mean diameter of monofilaments in the carbon fiber which is determined from one surface and the mean diameter of monofilaments in the carbon fiber which is determined from the other surface is 0.5 or more and 1 or less, and the difference between mean lengths of monofilaments in the carbon sheet which are determined in the same manner as described above is 0 mm or more and 10 mm or less.

In the carbon sheet, the diameter of a pore having the largest volume (peak diameter) in the pore diameter range of 1 to 100 μm is preferably 30 to 50 μm, more preferably 35 to 45 μm. When the peak diameter in pores having a diameter of 1 to 100 μm is 30 to 50 μm, suppression of flooding and improvement of mechanical properties can be more effectively attained.

The volume ratio of pores with a diameter of 50 to 100 μm and the diameter of a pore having the largest volume (peak diameter) in the pore diameter range of 1 to 100 μm can be determined using a distribution showing a pore diameter versus a pore volume. The distribution showing a pore diameter versus a pore volume is hereinafter referred to as a pore diameter distribution. Details thereof will be described below.

A method suitable to produce the carbon sheet will now be described in detail with a carbon paper, which includes a carbon fiber papermaking substrate as a porous material, as a representative example.

Porous Material

Examples of the carbon fiber include polyacrylonitrile (PAN)-based, pitch-based and rayon-based carbon fibers. Among them, a PAN-based carbon fiber or a pitch-based carbon fiber is preferably used because of its excellent mechanical strength.

In the carbon fiber in the carbon sheet and the porous material such as a papermaking substrate to be used to obtain the carbon sheet, the mean diameter of monofilaments is preferably 3 to 20 μm, more preferably 5 to 10 μm. When the mean diameter of monofilaments is 3 μm or more, the pore diameter becomes large, and the water removal performance is improved so that flooding can be suppressed. Meanwhile, when the mean diameter of monofilaments is 20 μm or less, the thickness of the carbon sheet is easily controlled to fall within a preferred range as described below, which is preferred.

In the carbon fiber to be used, the mean length of monofilaments is preferably 3 to 20 mm, more preferably 5 to 15 mm. When the mean length of monofilaments is 3 mm or more, the carbon sheet attains excellent mechanical strength, electrical conductivity and thermal conductivity. Meanwhile, when the mean length of monofilaments is 20 mm or less, dispersibility of the carbon fiber in papermaking is improved so that a uniform carbon sheet can be obtained. A carbon fiber having the above-mentioned mean length of monofilaments can be obtained by a method of cutting a continuous carbon fiber into a desired length or the like.

The mean diameter and mean length of monofilaments in the carbon fiber are usually measured by directly observing the carbon fiber for a carbon fiber to be a raw material, and can be measured by observing the carbon sheet.

The carbon fiber papermaking substrate formed by papermaking as one form of the porous material to be used to obtain the carbon sheet is preferably in the form of a sheet in which a carbon fiber is randomly dispersed in a two-dimensional plane to maintain the in-plane electrical conductivity and thermal conductivity to be isotropic. Papermaking of the carbon fiber in preparation of the carbon fiber papermaking substrate can be performed once, or performed multiple times in a laminated form.

It is preferred that in formation of a carbon sheet in a desired thickness, the carbon sheet be continuously formed in one process to prevent internal delamination of the carbon sheet. When the carbon sheet is thickly formed by a method in which a process of papermaking is carried out multiple times, a discontinuous surface is formed in a through-plane direction so that when the carbon sheet is bent, stresses may be concentrated, leading to internal delamination.

Specifically, for the mean diameter of monofilaments in the carbon fiber, the ratio of the mean diameter of monofilaments in the carbon fiber which is determined from one surface of the carbon sheet and the mean diameter of monofilaments in the carbon fiber which is determined from the other surface of the carbon sheet is preferably 0.5 or more and 1 or less for preventing internal delamination. When both the mean diameters are equal to each other, the ratio is 1, and when both the mean diameters are different from each other, the ratio is a ratio of the smaller mean diameter to the larger mean diameter.

A difference between the mean length of monofilaments in the carbon fiber which is determined from one surface of the carbon sheet and the mean length of monofilaments in the carbon fiber which is determined from the other surface of the carbon sheet is preferably 0 mm or more and 10 mm or less. When the above-mentioned ratio and the above-mentioned difference are in the above-mentioned ranges, the dispersion state of the carbon fiber can be made uniform in the porous material including the carbon fiber so that variations in density and thickness of the porous material can be reduced. A carbon sheet and a gas diffusion electrode substrate which are prepared using such a porous material have excellent surface smoothness and, therefore, can exhibit a state of uniform adhesion with a catalyst layer and an electrolyte membrane when formed into a membrane electrode assembly so that good fuel cell performance is obtained.

Impregnation of Resin Composition

In preparation of the carbon sheet, a porous material containing a carbon fiber such as a carbon fiber papermaking substrate is impregnated with a resin composition that serves as a binding material.

As a method of impregnating a resin composition as a binding material into a porous material including a carbon fiber, a method of dipping a porous material into a resin composition-containing solution, a method of coating a porous material with a resin composition-containing solution, a method of laminating and bonding a porous material to a film composed of a resin composition, or the like can be employed. Among them, a method of dipping a porous material into a resin composition-containing solution is preferably employed because of its excellent productivity. A carbon fiber-containing porous material impregnated with a resin composition that serves as a binding material may be described as a "prepreg".

In the carbon sheet, the filling rate of the layer decreases in the order of the layer X, the layer Y and the layer Z, or in the order of the layer 2, the layer 5 and the average between the layer 3 and the layer 4. The carbon sheet can be obtained by impregnating a resin composition into a porous material such that the amount of the resin composition impregnated decreases in the order of a layer as the layer X or the layer 2, a layer as the layer Y or the layer 5, a layer as the layer Z or the layer 3 or layer 4. Thus, by uniformly impregnating a resin composition as a binding material into the whole of a carbon fiber-containing papermaking substrate by dipping or the like, and then removing an excess amount of the adhered resin composition from one surface before drying, the amount of the resin composition in a through-plane direction in the carbon sheet is controlled and distributed so that the filling rate of each layer can be controlled.

As one example, a resin composition-containing solution can be suctioned from one surface of a carbon fiber papermaking substrate after the carbon fiber papermaking substrate is dipped into the resin composition-containing solution and before the carbon fiber papermaking substrate is dried, or a squeeze roll can be run over only one surface of the carbon fiber papermaking substrate. Accordingly, the loading amount in the vicinity of one surface, i.e. the surface Y can be made smaller than the loading amount in the vicinity of the surface X by the squeeze roll. Meanwhile, since a solvent in the resin composition is volatilized from the surface in a drying process, a larger amount of the resin composition may be distributed to the surface and, as a result, in the carbon sheet, the amount of the binding material can be changed such that it decreases in the order of the layer X, the layer Y and the layer Z situated between the layer X and the layer Y.

As another example, by dipping a carbon fiber papermaking substrate into a resin composition-containing solution, and then additionally coating only one surface of the carbon fiber papermaking substrate with the resin composition by a spray or a gravure roll, the filling rate of the layer in the carbon sheet decreases in the order of the layer X, the layer Y and the layer Z and/or in the order of the layer 2, the layer 5, and the average between the layer 3 and the layer 4.

The resin composition to be used in production of a prepreg is preferably a resin composition carbonized on baking to yield a binding material that is an electrically conductive carbide. The resin composition to be used in production of a prepreg is a resin component to which a solvent or the like is added as required. The resin component refers to a component containing a resin such as a thermosetting resin or a thermoplastic resin and, as required, an additive(s) such as a carbon powder and a surfactant.

More specifically, the carbonization yield of the resin component contained in the resin composition to be used in production of a prepreg is preferably 40% by mass or more. When the carbonization yield is 40% by mass or more, the carbon sheet attains excellent mechanical properties, electrical conductivity and thermal conductivity. The carbonization yield of the resin component in the resin composition is not particularly limited, and is normally about 60% by mass.

The resin constituting the resin component in the resin composition to be used in production of a prepreg includes thermosetting resins such as phenolic resins, epoxy resins, melamine resins and furan resins and the like. Among them, a phenolic resin is preferably used because of its high carbonization yield.

Further, as an additive to be added to a resin component as required, a carbon powder can be used as a resin component in the resin composition to be used in production of a prepreg, for the purpose of improving the mechanical properties, electrical conductivity and thermal conductivity of the carbon sheet. For the carbon powder, a carbon black such as furnace black, acetylene black, lamp black or thermal black, a graphite such as scaly graphite, scale-like graphite, earthy graphite, artificial graphite, expanded graphite or flaky graphite, a carbon nanotube, linear carbon, a milled fiber of carbon fiber or the like can be used.

As the resin composition to be used in production of a prepreg, a resin component obtained by the above-described constitution can be used as it is, and the resin composition may also contain, as required, a variety of solvents for the purpose of improving impregnation property into a porous material such as a carbon fiber papermaking substrate. As the solvent, methanol, ethanol, isopropyl alcohol or the like can be used.

The resin composition to be used in production of a prepreg is preferably in a liquid form under the condition of a temperature of 25° C. and 0.1 MPa. When the resin composition is in a liquid form, it has excellent impregnation property into a papermaking substrate so that the resulting carbon sheet attains excellent mechanical properties, electrical conductivity and thermal conductivity.

In impregnation of the resin composition, the porous material is impregnated with the resin composition such that the amount of the resin component is preferably 30 to 400 parts by mass, more preferably 50 to 300 parts by mass based on 100 parts by mass of the carbon fiber in the prepreg. When the amount of the resin component based on 100 parts by mass of the carbon fiber in the prepreg is 30 parts by mass or more, the carbon sheet has excellent mechanical properties, electrical conductivity and thermal conductivity. Meanwhile, when the amount of the resin component based on 100 parts by mass of the carbon fiber in the prepreg is 400 parts by mass or less, the carbon sheet has excellent gas diffusivity in an in-plane direction and excellent gas diffusivity in a through-plane direction.

Lamination and Annealing

After a prepreg in which a porous material such as a carbon fiber papermaking substrate is impregnated with a resin composition is formed, the prepreg can be laminated and/or annealed prior to carbonization.

A plurality of prepregs can be laminated to allow the carbon sheet to have a prescribed thickness. In this case, a plurality of prepregs having the same properties can be laminated, or a plurality of prepregs having different properties can be laminated. Specifically, it is possible to laminate a plurality of prepregs different in terms of the mean diameter and the mean length of monofilaments in the carbon fiber, the areal weight of the carbon fiber in a porous material such as a carbon fiber papermaking substrate to be used in preparation of the prepreg, the amount of the impregnated resin component and the like.

Meanwhile, lamination of a plurality of prepregs causes formation of a discontinuous surface in a through-plane direction so that internal separation may occur and, therefore, it is desirable that rather than laminating a plurality of porous materials such as carbon fiber papermaking substrates, only one porous material be subjected to annealing.

To increase viscosity of the resin composition in the prepreg or partially cross-link the resin composition, the prepreg can be subjected to annealing. As an annealing method, a method of blowing hot air against the prepreg, a method of heating the prepreg by sandwiching it between hot platens of a press apparatus, a method of heating the prepreg by sandwiching it between continuous belts or the like can be employed.

Carbonization

A porous material such as a carbon fiber paper making substrate is impregnated with a resin composition to obtain a prepreg, and the prepreg is then baked in an inert atmosphere for carbonizing the resin composition. For this baking, a batch-type heating furnace or a continuous heating furnace can be used. Further, the inert atmosphere can be obtained by allowing an inert gas such as nitrogen gas or argon gas to flow in the furnace.

The highest temperature in the baking is preferably 1300 to 3000° C., more preferably 1700 to 3000° C., and further preferably 1900 to 3000° C. When the highest temperature is 1300° C. or more, carbonization of the resin component in the prepreg is facilitated so that the carbon sheet attains excellent electrical conductivity and thermal conductivity. Meanwhile, when the highest temperature is 3000° C. or less, the operating cost of the heating furnace is reduced.

A porous material such as a carbon fiber papermaking substrate impregnated with a resin composition and then carbonized may be referred to as "baked carbon fiber". The carbon sheet means a baked carbon fiber, and both the baked carbon fiber before being subjected to a hydrophobic treatment and the baked carbon fiber after being subjected to a hydrophobic treatment correspond to the carbon sheet.

Method of Measuring of Filling Rates of Layer X, Layer Y and Layer Z

A method of measuring the filling rate of the carbon sheet obtained by the above method will be described in detail below.

The filling rates of the layer X, the layer Y and the layer Z are obtained by a three-dimensional measurement X-ray CT. The whole region in a through-plane direction is scanned every fixed length from one surface to the other surface of a carbon sheet by the three-dimensional measurement X-ray CT to obtain three-dimensional data for the carbon sheet. By analyzing the three-dimensional data, a filling rate on a measured surface can be obtained, and a filling rate in a specific layer can be determined. The above-mentioned fixed length (hereinafter, referred to as a slice pitch) may be arbitrarily set, but it is not more than ⅓ of the mean diameter of monofilaments in a carbon fiber that forms the carbon sheet.

The filling rate on a surface at a predetermined position in a through-plane direction in the carbon sheet is determined in the following manner. Using "J-trim" that is an image processing program, a slice image at the position in the three-dimensional data is divided in 256 stages between the maximum and the minimum of lightness in terms of a luminance, a portion at the 175th grayscale stage from the minimum is defined as a threshold, and binarization is performed. The ratio of the area of a lighter binarized part in the total area is a filling rate on a surface at a predetermined position. The filling rate on a surface at a predetermined position is determined every fixed length from one surface to the other surface of the carbon sheet to obtain a distribution of the filling rate on the surface every fixed length in the through-plane direction. An average value is determined using the values of the thus-obtained filling rates on all the surfaces, and the value of 50% (½) of the average value is defined as a 50% filling rate.

For each of layers obtained by dividing the carbon sheet in a through-plane direction into three equal parts within a section extending from a surface having a 50% filling rate, which is closest to one surface, to a surface having a 50% filling rate, which is closest to the other surface, an average value obtained using the filling rates on surfaces that form the layer is defined as a filling rate of the layer.

A layer which is close to one surface and has the highest layer filling rate is a layer X, a layer which is close to the other surface and has a layer filling rate smaller than that of the layer X is a layer Y, and a layer situated between the layer X and the layer Y is a layer Z.

The one-measurement visual field to calculate a filling rate on a surface depends on the slice pitch, but a plurality of measurements are made so that the total of the areas of measurement visual fields is 5 mm$^2$ or more, and an average value of the measurements is determined to obtain a filling rate of the layer.

The X-ray CT to be used in the measurement is SMX-160 CTS manufactured by Shimadzu Corporation or its equivalent apparatus. In examples described below, the mean diameter of monofilaments in the carbon fiber is 7 μm and, therefore, to determine a filling rate on a surface with the slice pitch set to 2.1 μm and the measurement visual field set to 1070 μm so that the area of the measurement visual field is 5 mm$^2$ or more, the number of measurements in determination of a filling rate on one surface is set to 7.

Method of Measuring Filling Rate of Layers 1 to 6

The filling rates of layers 1 to 6 are obtained through observation with a scanning electron microscope under compression. A thickness at 0.15 MPa is measured, a cross section of a carbon sheet provided with a clearance equal to the value of the thickness and clipped by a compression tool is observed with a scanning electron microscope. By subjecting only the cross section portion of the carbon sheet in the obtained image to image processing, and dividing the image into six equal parts in a cross section direction, a filling rate in a specific layer can be determined.

The filling rate of a layer at a predetermined position in a through-plane direction in the carbon sheet is determined in the following manner. Using "J-trim" that is an image processing program, an image at the position in the cross section observation image is extracted, and then divided in 256 stages between the maximum and the minimum of lightness in terms of a luminance, a portion at the 128th grayscale stage from the minimum is defined as a threshold, and binarization is performed. The ratio of the area of a lighter binarized part in the total area is an apparent filling rate on a surface at a predetermined position. A value obtained by dividing the apparent filling rate of a layer at predetermined position by the bulk filling rate of the carbon sheet is a filling rate under compression. The bulk filling rate can be determined from the ratio of a bulk density to a true specific gravity.

The one-measurement magnification of calculating a filling rate under compression is not particularly limited as long as the thickness of the carbon sheet is included within a measurement image, and a carbon fiber that forms the carbon sheet is discriminable, but a plurality of measurements are made so that the total of the through-plane-direction widths of measurement visual fields of calculating a filling rate under compression is 20 mm or more, and an average value of the measurements is determined to obtain a filling rate of the layer under compression.

The scanning electron microscope to be used in the measurement is SU8010 manufactured by Hitachi High-Tech Fielding Corporation, or its equivalent apparatus. In examples described below, to determine a filling rate on a surface with the measurement magnification set to 50 and the width of the measurement visual field set to 2.54 mm, the number of measurements in determination of a filling rate on one surface is set to 10.

Hydrophobic Treatment

It is preferred that the baked carbon fiber be subjected to a hydrophobic treatment for the purpose of improving water removal performance. The hydrophobic treatment can be performed by coating the baked carbon fiber with a hydrophobic material and subsequently annealing the coated baked carbon fiber. By performing the hydrophobic treatment, a carbon sheet containing a hydrophobic material as a binding material can be obtained.

As the hydrophobic material, a fluorine-based polymer is preferably used because of its excellent corrosion resistance. The fluorine-based polymer includes polytetrafluoroethylene (PTFE), tetrafluoroethylene-hexafluoro propylene copolymers (FEP), tetrafluoroethylene-perfluoroalkylvinyl ether copolymers (PFA) and the like.

In the carbon sheet according to the first example, the sliding angle of water at a surface Y is preferably 40 degrees or less where the surface Y is a surface closest to the layer Y. By forming a microporous layer on the surface X side of the carbon sheet, the gas diffusion electrode substrate can be obtained. When the gas diffusion electrode substrate is used as a fuel cell, the surface Y is on the bipolar plate side, and good water removal performance from the carbon sheet to the bipolar plate can be obtained by setting the sliding angle of water at the surface Y to 40 degrees or less. The sliding angle at the surface Y is preferably as small as possible, and the best water removal performance can be achieved at a sliding angle of 1 degree.

In the carbon sheet according to the second example, the sliding angle of water at a surface 6 is preferably 40 degrees or less where the surface 6 is a surface included in the layer 6. By forming a microporous layer on the surface 1 side of the carbon sheet, the gas diffusion electrode substrate can be obtained. When the gas diffusion electrode substrate is used as a fuel cell, the surface 6 is on the bipolar plate side, and good water removal performance from the carbon sheet to the bipolar plate can be obtained by setting the sliding angle of water at the surface 6 to 40 degrees or less. The sliding angle at the surface 6 is preferably as small as possible, and the best water removal performance can be achieved at a sliding angle of 1 degree.

As a method of performing control so that the sliding angle at the surface Y or the surface 6 is 40 degrees or less, mention may be made of a method of subjecting a baked carbon fiber to a hydrophobic treatment. In annealing in the hydrophobic treatment step, the hydrophobic material is melted, and thus has a low viscosity so that the hydrophobic material can be uniformly adhered to the surface of the carbon fiber in the carbon sheet, and the sliding angle of water can be kept at 40 degrees or less to improve the hydrophobicity of the carbon sheet.

Meanwhile, by thinly adhering the hydrophobic material to the surface of the carbon fiber, electrical conductivity with the bipolar plate can be improved and, therefore, it is preferred that the carbon sheet contain the hydrophobic material. The melting point of the hydrophobic material to be used in the hydrophobic treatment is preferably 200° C. or more and 320° C. or less, more preferably 250° C. or more and 310° C. or less. As a type of the hydrophobic material that satisfies the above-mentioned requirement, mention is made of FEP or PFA. By using the above-mentioned material as a hydrophobic material, the sliding angle of water at the surface Y or the surface 6 can be made equal to or less than 40 degrees and, therefore, the water removal performance of the carbon sheet can be considerably enhanced so that accumulation of water in the carbon sheet subjected to the hydrophobic treatment can be reduced and, therefore, gas diffusivity can be considerably improved. Thus, fuel cell performance is considerably improved.

The coating amount of the hydrophobic material in the hydrophobic treatment is preferably 1 to 50 parts by mass, more preferably 2 to 40 parts by mass based on 100 parts by mass of the baked carbon fiber. When the coating amount of the hydrophobic material is 1 part by mass or more based on 100 parts by mass of the baked carbon fiber, the carbon sheet has excellent water removal performance. Meanwhile, when the coating amount of the hydrophobic material is 50 parts by mass or less based on 100 parts by mass of the baked carbon fiber, the carbon sheet has excellent electrical conductivity.

Gas Diffusion Electrode Substrate

The gas diffusion electrode substrate will now be described.

The gas diffusion electrode substrate can be prepared by forming the below-described microporous layer on the carbon sheet.

Formation of Microporous Layer

A microporous layer as one of the constituent elements of the gas diffusion electrode substrate will now be described.

The carbon sheet can be used as a gas diffusion electrode substrate by forming the microporous layer on one surface of the carbon sheet. The gas diffusion electrode substrate has a microporous layer on the surface X or surface 1 side of the carbon sheet.

The areal weight of the microporous layer is not particularly limited, but it is preferably 10 to 35 $g/m^2$, more preferably 30 $g/m^2$ or less, further preferably 25 $g/m^2$ or less. The areal weight of the microporous layer is preferably 14 $g/m^2$ or more, more preferably 16 $g/m^2$ or more.

When the areal weight of the microporous layer is 10 $g/m^2$ or more, one surface of the carbon sheet can be covered with the microporous layer, and back-diffusion of generated water is further promoted so that dry-out of the electrolyte membrane can be further suppressed. When the areal weight of the microporous layer is 35 g/m² or less, water removal performance is further improved so that flooding can be further suppressed.

It is preferred that the microporous layer contain a filler. As the filler, a carbon powder is preferred. Examples of the carbon powder include carbon blacks such as furnace black, acetylene black, lamp black and thermal black, graphites such as scaly graphite, scale-like graphite, earthy graphite, artificial graphite, expanded graphite and flaky graphite, carbon nanotubes, linear carbon and milled fibers of carbon fiber. Among them, for the carbon powder, a carbon black is more preferably used, and acetylene black is preferably used because the content of impurities is low.

The microporous layer contains a carbon powder, and the carbon powder includes carbon having an aspect ratio of 30 to 5000, whereby penetration of a filler-containing coating solution as a precursor of the microporous layer into the carbon sheet can be properly suppressed to improve gas diffusivity and water removal performance in an in-plane direction so that flooding can be suppressed and, further, a microporous layer having a sufficient thickness is formed on a surface layer of the carbon sheet and back-diffusion of generated water is promoted so that dry-out can be suppressed.

It is preferred that the microporous layer contain water removal material from the viewpoint of promoting removal of water. In particular, a fluorine-based polymer is preferably used as the hydrophobic material because of its excellent corrosion resistance. The fluorine-based polymer includes polytetrafluoroethylene (PTFE), tetrafluoroethylene-hexafluoro propylene copolymers (FEP), tetrafluoroethylene-perfluoroalkylvinyl ether copolymers (PFA) and the like.

The microporous layer can be formed by coating one surface of the carbon sheet with the coating solution (filler-containing coating solution) containing the filler.

The filler-containing coating solution may contain a dispersion medium such as water or an organic solvent, and may contain a dispersant such as a surfactant. The dispersion medium is preferably water, and a nonionic surfactant is preferably used as the dispersant. The filler-containing coating solution may contain a filler such as a variety of carbon powders and a hydrophobic material as described above.

Coating of the carbon sheet with the filler-containing coating solution can be performed using a variety of commercially available coating apparatuses. As a coating system, a coating system such as screen printing, rotary screen printing, spraying, intaglio printing, gravure printing, die coating, bar coating or blade coating can be employed. The coating methods exemplified above are presented for the illustration purpose only, and the coating method is not necessarily restricted thereto.

It is preferred to dry the coating solution at a temperature of 80 to 180° C. after coating the carbon sheet with the filler-containing coating solution. That is, the coated matter is placed in a dryer whose temperature is set at 80 to 180° C. and dried for 5 to 30 minutes. The drying air volume may be appropriately decided, but rapid drying may induce micro cracks in the surface. It is preferred that after the coated matter is dried, the coated matter be placed in a muffle furnace, a baking furnace or a high-temperature drying furnace, and heated at preferably at a temperature of 300 to 380° C. for 5 to 20 minutes to melt the hydrophobic material so that fillers such as carbon powders are bonded together into a binder to form the microporous layer.

Membrane Electrode Assembly

A membrane electrode assembly can be formed by binding the above-described gas diffusion electrode substrate on at least one surface of a solid polymer electrolyte membrane having a catalyst layer on both surfaces. At this time, when the microporous layer of the gas diffusion electrode substrate is arranged on the catalyst layer side, back-diffusion of the generated water is more likely to occur, and also the contact area between the catalyst layer and the gas diffusion electrode substrate is increased so that the contact electrical resistance can be reduced.

Fuel Cell

The fuel cell is a fuel cell including the gas diffusion electrode substrate, i.e. a fuel cell having bipolar plates on both sides of the membrane electrode assembly described above. That is, the fuel cell is constituted of arranging bipolar plates on both sides of the membrane electrode assembly described above. Usually, a polymer electrolyte fuel cell is constituted of laminating a plurality of such membrane electrode assemblies that are sandwiched by bipolar plates from both sides via a gasket. The catalyst layer is composed of a layer containing a solid polymer electrolyte and a carbon material of carbon-supported catalyst. As the catalyst, platinum is usually used. In a fuel cell in which a carbon monoxide-containing reformed gas is supplied to the anode side, it is preferred to use platinum and ruthenium as catalysts of the anode side. As the solid polymer electrolyte, it is preferred to use a perfluorosulfonic acid-based polymer material having high protonic conductivity, oxidation resistance, and heat resistance. The constitutions themselves of the above-mentioned fuel cell unit and fuel cell are well known.

EXAMPLES

The carbon sheet and the gas diffusion electrode substrate will now be described in detail by ways of examples. The materials and the methods of producing a carbon sheet and a gas diffusion electrode substrate, and the battery performance evaluation method of fuel cell that are used in the examples are described below.

Preparation of Carbon Sheet

Preparation of 150 μm-Thick Carbon Sheet

Polyacrylonitrile-based carbon fiber "TORAYCA" (registered trademark) T300 (mean diameter of monofilaments: 7 μm) manufactured by Toray Industries, Inc. was cut at a short fiber mean length of 12 mm and dispersed in water to continuously make a paper by a wet papermaking method. Further, a 10% by mass aqueous solution of polyvinyl alcohol as a binder was coated on the paper and then dried to prepare a carbon fiber papermaking substrate having a carbon fiber areal weight of 30.0 g/m². The coating amount of the polyvinyl alcohol was 22 parts by mass with respect to 100 parts by mass of the carbon fiber papermaking substrate.

Next, using a resin composition obtained by mixing a resol type phenolic resin and a novolak type phenolic resin at a 1:1 mass ratio as a thermosetting resin, scaly graphite (mean particle size 5 μm) as a carbon powder and methanol as a solvent, the materials were mixed at a ratio of thermosetting resin/carbon powder/solvent=10 parts by mass/5 parts by mass/85 parts by mass, and the resulting mixture stirred for 1 minute using an ultrasonic dispersion apparatus to obtain a uniformly dispersed resin composition.

Next, the carbon fiber papermaking substrate was cut into a size of 15 cm×12.5 cm and dipped into a resin composition impregnation liquid filled into an aluminum tray, and sandwiched between rolls, and squeezed to impregnate the resin composition. The two rolls were arranged horizontally with a fixed clearance provided therebetween, and the carbon fiber papermaking substrate was lifted upward vertically to adjust the loading amount of the resin composition as a whole. One of the two rolls was a smooth metallic roll having a structure allowing an excess resin to be removed by a doctor blade, and as the other roll, a roll provided with irregularities and thus configured as a gravure roll was used. The carbon fiber papermaking substrate was sandwiched by the metallic roll on the one surface side and the gravure roll on the other surface side, and the resin composition impregnation liquid was squeezed so that there was a difference between loading amounts of the resin composition on one surface and the other surface of the carbon fiber papermaking substrate. Thereafter, the carbon fiber papermaking substrate was heated and dried at a temperature of 100° C. for 5 minutes to prepare a prepreg. Next, the prepreg was annealed at a temperature of 180° C. for 5 minutes while being pressed by a pressing machine with flat plates. When pressing the prepreg, the space between the upper and lower press plates was adjusted by arranging a spacer in the pressing machine with flat plate such that the annealed prepreg had a thickness of 195 μm.

A substrate obtained by annealing the prepreg was introduced into a heating furnace having the highest temperature of 2400° C., in which a nitrogen gas atmosphere was maintained to obtain a carbon sheet composed of a baked carbon fiber.

The carbon sheet prepared as described above was dipped into a water dispersion liquid of PTFE resin ("POLYFLON" (registered trademark) PTFE Dispersion D-1E (manufactured by DAIKIN INDUSTRIES, Ltd.)) or a water dispersion liquid of FEP resin ("NEOFLON" (registered trademark) FEP Dispersion ND-110 (manufactured by DAIKIN INDUSTRIES, Ltd.)) to impregnate the baked carbon fiber with the hydrophobic material. Thereafter, the carbon sheet was heated and dried in a drying furnace at a temperature of 100° C. for 5 minutes to prepare a carbon sheet subjected to a hydrophobic treatment. In the drying, the carbon sheet was vertically arranged, and the vertical direction changed every 1 minute. The water dispersion liquid of the hydrophobic material was diluted to an appropriate concentration to add 5 parts by mass of the hydrophobic material to the 95 parts by mass of the carbon sheet in terms of an amount after drying. A carbon sheet having an areal weight of 45 g/m$^2$ and a thickness of 150 μm was prepared.

Preparation of Gas Diffusion Electrode Substrate

Materials

Carbon powder A: acetylene black: "DENKA BLACK" (registered trademark) manufactured by Denka Company Limited)

Carbon powder B: linear carbon: "VGCF" (registered trademark) (manufactured by SHOWA DENKO K.K.), aspect ratio: 70

Material C: hydrophobic material: PTFE resin ("POLYFLON" (registered trademark) PTFE Dispersion D-1E (manufactured by DAIKIN INDUSTRIES, Ltd.)) that is a water dispersion liquid containing 60 parts by mass of PTFE resin Material D: surfactant "TRITON" (registered trademark) X-100 (manufactured by Nacalai Tesque)

A filler-containing coating solution was prepared by mixing the above-mentioned materials using a disperser. One surface of the carbon sheet subjected to a hydrophobic treatment was coated with the filler-containing coating solution in a planar form using a slit die coater, and heating then performed at a temperature of 120° C. for 10 minutes, and then at a temperature of 380° C. for 10 minutes. In this way, a microporous layer was formed on the carbon sheet subjected to a hydrophobic treatment so that a gas diffusion electrode substrate was prepared. The filler-containing coating solutions are filler-containing coating solutions prepared using a carbon powder, a hydrophobic material, a surfactant and purified water and adjusted to have compositions of the carbon coating solutions with the addition amounts described in terms of parts by mass as shown in the tables. The addition amounts of the material C (PTFE resin) shown in the tables represent the addition amount of PTFE resin itself rather than the addition amounts of the water dispersion liquid of PTFE resin.

Evaluation of Fuel Cell Performance of Polymer Electrolyte Fuel Cell

A catalyst paste was prepared by sequentially adding 1.00 g of a carbon material of carbon-supported platinum catalyst (manufactured by Tanaka Kikinzoku Kogyo K.K., platinum supporting amount: 50% by mass), 1.00 g of purified water, 8.00 g of "NAFION" (registered trademark) solution (manufactured by Aldrich, "NAFION" (registered trademark), 5.0% by mass) and 18.00 g of isopropyl alcohol (manufactured by Nacalai Tesque).

Then, a "NAFLON" (registered trademark) PTFE tape "TOMBO" (registered trademark) No. 9001 (manufactured by NICHIAS Corporation) cut into a size of 5 cm×5 cm was coated with the obtained catalyst paste using a spray and dried at ordinary temperature to prepare a PTFE sheet equipped with a catalyst layer having a platinum amount of 0.3 mg/cm$^2$. Subsequently, a solid polymer electrolyte membrane, "NAFION" (registered trademark) NRE-211CS (manufactured by DuPont) cut into a size of 8 cm×8 cm was sandwiched with two catalyst layer-equipped PTFE sheets. The resultant was pressed at a temperature of 130° C. for 5 minutes while pressurizing at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 5 cm×5 cm, and the resultant pressed at a temperature of 130° C. for 5 minutes while pressurizing at 3 MPa using a pressing machine with flat plates, thereby preparing a membrane electrode assembly. The gas diffusion electrode substrate was arranged such that the surface having the microporous layer was in contact with the catalyst layer.

The obtained membrane electrode assembly was incorporated into a fuel cell evaluation unit cell to measure the voltage when the current density was changed. As a bipolar plate, a serpentine-type bipolar plate having one flow channel of 1.0 mm in each of channel width, channel depth and rib width was used. Further, the evaluation was carried out with non-pressurized hydrogen and non-pressurized air being supplied to the anode side and the cathode side, respectively.

To examine the anti-flooding characteristic, hydrogen and air were humidified using a humidification pot whose temperature was set at 40° C. The humidity at this time was 100%. The utilization ratios of hydrogen and atmospheric oxygen were set at 70 mol % and 40 mol %, respectively. The output voltage at a current density of 1.5 A/cm$^2$ was measured, and used as an index of the anti-flooding characteristic.

Measurement of Pore Diameter Distribution

A pore diameter distribution was obtained by a mercury penetration method. Three specimens of about 12 mm×20 mm square were cut out from the carbon sheet, precisely weighed, and then put in a measuring cell to not overlap one another, and mercury was injected into the cell under reduced pressure. A measurement was made under the conditions shown below.

Measurement pressure range: 6 kPa (pressure at the start of measurement) (pore diameter: 400 μm) to 414 MPa (pressure at the end of measurement) (pore diameter: 40 nm)

Measurement cell mode: pressure raising process in the above pressure range

Cell volume: 5 cm³

Surface tension of mercury: 485 dyn/cm

Contact angle of mercury: 130°

As the measurement apparatus, AutoPore 9520 manufactured by Shimadzu Corporation was used, but its equivalent product can also be used. The sum of volumes of pores having a diameter of 1 to 100 μm and the sum of volumes of pores having a diameter of 50 to 100 μm was determined, and the volume ratio of pores with a diameter of 50 to 100 μm was calculated. A peak diameter was determined from this pore diameter distribution.

Measurement of Areal Weight

The areal weights of the carbon sheet and the gas diffusion electrode substrate were determined by the mass of a sample cut into a 10-cm square by the area (0.01 m²) of the sample.

Measurement of Thickness

A carbon sheet and a gas diffusion electrode substrate were placed on a smooth surface plate, and a difference in height between the presence of a measurement object and the absence of the measurement object was measured in a state in which a pressure of 0.15 MPa was applied. Samples were taken at 10 different parts, measured values of the difference in height were averaged, and the average thus obtained was defined as a thickness.

Measurement of Mean Diameter in Monofilaments in Carbon Fiber

The mean diameter of monofilaments in the carbon fiber is an average value determined by taking a photograph of the carbon fiber on one surface of the carbon sheet at a magnification of 1000 times, under a microscope such as a scanning electron microscope, randomly selecting 30 different monofilaments, and measuring their diameters. The mean diameter of monofilaments in the carbon fiber on the other surface of the carbon sheet is determined in the same manner as described above. As the scanning electron microscope, S-4800 manufactured by Hitachi, Ltd. or its equivalent product can be used. The mean diameters determined from the surface X and the surface Y are shown in the tables.

The "mean diameter of monofilaments (surface X/surface Y)" in the tables shows the mean diameter of monofilaments in the carbon fiber which is determined from the surface X side and the mean diameter of monofilaments in the carbon fiber which is determined from the surface Y side.

Measurement of Mean Length of Monofilaments in Carbon Fiber

The mean length of monofilaments in the carbon fiber was obtained by taking a photograph of the carbon fiber on one surface of the carbon sheet at a magnification of 50 times, under a microscope such as a scanning electron microscope, randomly selecting 30 different monofilaments, measuring their length, and determining an average value thereof. The mean diameter of monofilaments in the carbon fiber on the other surface of the carbon sheet can be determined in the same manner as described above. As the scanning electron microscope, S-4800 from Hitachi, Ltd. or its equivalent product can be used.

Measurement of Bending Amount of Carbon Sheet

A bending amount of the carbon sheet is measured in the following manner. A carbon sheet sample cut to a size of 50×50 mm is sandwiched between a block with a channel with a channel width of 1 mm and a rib width of 1 mm and a flat block, and pressing performed to apply a pressure of 1 MPa to the sample. The sample is arranged such that the surface Y of the carbon sheet faces a surface of the block with a channel, a deformation of the carbon sheet at the central part in pressing from the side surfaces of the blocks is photographed at a magnification of 100 using a digital microscope, a thickness d1 of a channel portion and a thickness d2 of a rib portion are measured on an image, and a bending amount is calculated from the following equation.

$$\text{bending amount}(\%) = (d1-d2)/d2 \times 100$$

The number of measurements is set to 5, and from the average value of the measurements, the bending amount is calculated.

When the bending amount is 10% or less, bending to a bipolar plate at the time when a carbon sheet and a gas diffusion electrode substrate including the carbon sheet are incorporated into a fuel cell stack can be prevented. When the bending amount is 5% or less, the bending to the bipolar plate can be extremely favorably prevented.

Measurement of Sliding Angle

The sliding angle of the carbon sheet subjected to a hydrophobic treatment was determined by a sliding method using an automated contact angle meter. As the apparatus, an automated contact angle meter DM-501 manufactured by Kyowa Interface Science Co., Ltd. was used. The carbon sheet subjected to a hydrophobic treatment was fixed on an apparatus stage with the surface Y set on the upper side (measurement side), 10 μL of a droplet of ion-exchanged water was added to the carbon sheet subjected to a hydrophobic treatment, the carbon sheet subjected to a hydrophobic treatment was then inclined together with the apparatus stage, and the inclination angle at the time when the droplet started to slide down along the surface of the carbon sheet subjected to a hydrophobic treatment was defined as a sliding angle.

Measurement of Melting Point of Hydrophobic Material

The melting point of a hydrophobic material in the carbon sheet subjected to a hydrophobic treatment was measured by differential scanning calorimetry. As the apparatus, DSC 6220 manufactured by SII (Seiko Instruments Inc.) was used. The carbon sheet subjected to a hydrophobic treatment was cut, and enclosed in an aluminum pan, the temperature was changed from 30° C. to 400° C. at a heating rate of 2° C./min in nitrogen. The endothermic and exothermic peaks at that time were observed, and the endothermic peak at a temperature of 150° C. or more was defined as the melting point of the hydrophobic material.

Example 1

In accordance with the methods described in "Preparation of Carbon Sheet", "Hydrophobic Treatment" and "Preparation of Gas Diffusion Electrode Substrate", a gas diffusion electrode substrate including a 150 μm-thickness porous carbon sheet as shown in Table 1 was obtained. The results are shown in Table 1. This carbon sheet exhibited a good anti-flooding characteristic of 0.35 V or more and a very good bending amount of 5% or less, and attained an anti-flooding characteristic and was inhibited from bending.

Example 2

In accordance with the methods described in "Preparation of Carbon Sheet" and "Formation of Microporous Layer", a gas diffusion electrode substrate including a 150 μm-thickness porous carbon sheet as shown in Table 1 was obtained. A large amount of a binding material was removed from the whole of the carbon sheet to considerably change a difference in filling rate between the layers as compared to Example 1. This carbon sheet exhibited a good anti-flooding characteristic of 0.35 V or more and a very good bending amount of 5% or less, and attained an anti-flooding characteristic and was inhibited from bending. The remarkable improvement of the anti-flooding characteristic may be because there was a large difference between the filling rate ratio of the layer X and the filling rate ratio of the layer Z, and there was a large difference between the filling rate ratio of the layer 2 and the average of the filling rate ratios of the layer 3 and the layer 4, leading to enhancement of water removal performance.

Example 3

In accordance with the methods described in "Preparation of Carbon Sheet" and "Formation of Microporous Layer", a gas diffusion electrode substrate including a 150 μm-thickness porous carbon sheet as shown in Table 1 was obtained. A large amount of a binding material was removed from the whole of the carbon sheet, and drying of a prepreg was performed at a higher temperature to reduce the filling rate of the layer Z as compared to Example 2. This carbon sheet exhibited a very good anti-flooding characteristic of 0.40 V or more and a very good bending amount of 5% or less, and attained an anti-flooding characteristic and was inhibited from bending. The remarkable improvement of the anti-flooding characteristic may be because the filling rate ratio of the layer Z was particularly small, and the average of the filling rate ratios of the layer 3 and the layer 4 was particularly small, leading to enhancement of water removal performance.

Example 4

In accordance with the methods described in "Preparation of Carbon Sheet" and "Formation of Microporous Layer", a gas diffusion electrode substrate including a 150 μm-thickness carbon sheet as shown in Table 1 was obtained. A large amount of a binding material was removed from the surface Y, and drying of a prepreg was performed at a higher temperature to reduce the filling rate of the layer Y with respect to the layer X as compared to Example 3. This carbon sheet exhibited a good anti-flooding characteristic of 0.40 V or more and a good bending amount of 10% or less, and attained an anti-flooding characteristic and was inhibited from bending. The remarkable improvement of the anti-flooding characteristic may be because the filling rate ratio of the layer Z was particularly small and the filling rate ratio of the layer X was particularly large, and the average of the filling rate ratios of the layer 3 and the layer 4 was particularly small and the filling rate ratio of the layer 2 was particularly large, leading to enhancement of water removal performance.

Example 5

A 50 μm-thick high-density carbon sheet prepreg was prepared in accordance with the methods described in preparation of a 150 μm-thick carbon sheet in Example 1, except that the areal weight of the carbon fiber was 10.0 g/m², and the carbon fiber papermaking substrate was sandwiched between rolls of the same shape from both surfaces in adherence of the resin composition in "Preparation of Carbon Sheet". In adherence of the resin of the prepreg, the amount of the resin composition removed was adjusted to prepare a 50 μm-thick medium-density carbon sheet prepreg and a 50 μm-thick low-density carbon sheet prepreg. These three 50 μm-thick carbon sheet prepregs were laminated in the order of the high-density carbon sheet prepreg, the low-density carbon sheet prepreg and the medium-density carbon sheet prepreg, and heated and pressed before being baked. Otherwise, a gas diffusion electrode substrate including a 150 μm-thickness carbon sheet as shown in Table 1 was obtained. This carbon sheet exhibited a very good anti-flooding characteristic of 0.40 V or more and a very good bending amount of 5% or less, and attained an anti-flooding characteristic and was inhibited from bending. The remarkable improvement of the anti-flooding characteristic may be because the filling rate ratio of the layer Z was particularly small, leading to enhancement of water removal performance.

Example 6

In accordance with the methods described in "Preparation of Carbon Sheet", and "Formation of Microporous Layer", a gas diffusion electrode substrate was prepared in the same manner as in Example 2 except that the hydrophobic material used for the hydrophobic treatment of the carbon sheet was changed to a polyfluoroethylene-polyfluoropropylene copolymer (FEP). A gas diffusion electrode substrate including a 150 μm-thickness porous carbon sheet as shown in Table 1 was obtained. This carbon sheet exhibited a very good anti-flooding characteristic of 0.40 V or more and a very good bending amount of 5% or less, and attained an anti-flooding characteristic and was inhibited from bending.

Example 7

In accordance with the methods described in "Preparation of Carbon Sheet" and "Formation of Microporous Layer", a gas diffusion electrode substrate was prepared in the same manner as in Example 2 except that the composition of the microporous layer was changed. A gas diffusion electrode substrate including a 150 μm-thickness porous carbon sheet as shown in Table 1 was obtained. This carbon sheet exhibited a very good anti-flooding characteristic of 0.40 V or more and a very good bending amount of 5% or less, and this carbon sheet exhibited good fuel cell performance and a good bending amount, attained an anti-flooding characteristic and was inhibited from bending, and had a considerably improved anti-flooding characteristic.

Example 8

A long fiber of polyacrylonitrile was subjected to a flameproofing treatment at a temperature of 200° C. for 10 minutes, a nonwoven fabric was prepared by a water flow entanglement treatment, and roll pressing was performed. The long fiber was then introduced into a heating furnace at a temperature of 2000° C. and subjected to a carbonization treatment to obtain a carbon sheet composed of a baked carbon fiber of a 150 μm-thick nonwoven fabric. Next, the PTFE resin used in "Hydrophobic Treatment" as a hydrophobic material also serving as a binding material and the carbon powder A used in "Preparation of Gas Diffusion Electrode Substrate" were dispersed at a solid mass ratio of 1:1 to prepare a water dispersion liquid of a hydrophobic material (the concentration of the water dispersion liquid of a hydrophobic material was adjusted so that 5 parts by mass of the hydrophobic material would be added to 95 parts by mass of the carbon sheet after drying).

Next, the carbon sheet composed of a baked carbon fiber as a nonwoven fabric was dipped into the water dispersion liquid of a hydrophobic material which was filled into an aluminum tray, and the carbon sheet was sandwiched between two horizontally arranged rolls (one of the two rolls is a smooth metallic roll having a doctor blade, and the other roll is a gravure roll provided with irregularities) with a certain clearance provided therebetween, and squeezed to impregnate the water dispersion liquid so that there was a difference between the loading amounts of the hydrophobic material on one surface and the other surface of the carbon sheet. Thereafter, the carbon sheet was heated and dried at a temperature of 100° C. for 5 minutes. In this way, a gas diffusion electrode substrate including a 150 μm-thickness porous carbon sheet as shown in Table 1 was obtained. This carbon sheet exhibited a very good anti-flooding characteristic of 0.40 V or more and a very good bending amount of 5% or more, attained an anti-flooding characteristic and was inhibited from bending, and had a considerably improved anti-flooding characteristic.

Comparative Example 1

A 50 μm-thick high-density carbon sheet prepreg was prepared in accordance with the methods described in preparation of a 150 μm-thick carbon sheet in Example 1, except that the areal weight of the carbon fiber was 10.0 g/m$^2$, and the carbon fiber papermaking substrate was sandwiched between rolls of the same shape from both surfaces in adherence of the resin composition in "Preparation of Carbon Sheet". In adherence of the resin of the prepreg, the amount of the resin composition removed was further adjusted to prepare a 50 μm-thick medium-density carbon sheet prepreg. Two high-density carbon sheet prepregs and one medium-density carbon sheet prepreg were laminated in the order of the high-density carbon sheet prepreg, the medium-density carbon sheet prepreg and the high-density carbon sheet prepreg, and heated and pressed before being baked. Otherwise in accordance with the method described in Example 1, a gas diffusion electrode substrate including a 150 μm-thickness carbon sheet as shown in Table 1 was obtained. This carbon sheet was highly inhibited from bending, but had insufficient performance in terms of the anti-flooding characteristic.

Comparative Example 2

A 50 μm-thick medium-density carbon sheet prepreg was prepared in accordance with the methods described in preparation of a 150 μm-thick carbon sheet in Example 1, except that the areal weight of the carbon fiber was 10.0 g/m$^2$, and the carbon fiber papermaking substrate was sandwiched between rolls of the same shape from both surfaces in adherence of the resin composition in "Preparation of Carbon Sheet". In adherence of the resin of the prepreg, the amount of the resin composition removed was adjusted to prepare a 50 μm-thick low-density carbon sheet prepreg. Two medium-density carbon sheet prepregs and one low-density carbon sheet prepreg were laminated in the order of the medium-density carbon sheet prepreg, the low-density carbon sheet prepreg and the medium-density carbon sheet prepreg, and heated and pressed before being baked. Otherwise in accordance with the method described in Example 1, a gas diffusion electrode substrate including a 150 μm-thickness carbon sheet as shown in Table 1 was obtained. This carbon sheet was highly inhibited from bending, but had insufficient performance in terms of the anti-flooding characteristic.

Comparative Example 3

A gas diffusion electrode substrate was prepared in the same manner as in Example 1 except that a resin composition was adhered to one surface by gravure coating in impregnation of the resin composition into the carbon fiber papermaking substrate in the methods described in "Preparation of Carbon Sheet" and "Formation of Microporous Layer". Thus, a gas diffusion electrode substrate including a 150 μm-porous carbon sheet as shown in Table 1 was obtained. This carbon sheet bent into a bipolar plate to block a flow channel, and had an insufficient anti-flooding characteristic.

TABLE 1

| | | Example 1 | Example 2 | Example 3 | Example 4 | Example 5 | Example 6 |
|---|---|---|---|---|---|---|---|
| Carbon sheet | Thickness [μm] | 150 | 150 | 150 | 150 | 150 | 150 |
| | Areal weight [g/m$^2$] | 51 | 49 | 47 | 45 | 45 | 49 |
| | Mean diameter of monofilament (surface X/surface Y) [μm] | 7.0/7.0 | 7.0/7.0 | 7.0/7.0 | 7.0/7.0 | 7.0/7.0 | 7.0/7.0 |
| | Type of hydrophobic material | PTFE | PTFE | PTFE | PTFE | PTFE | FEP |
| | Filling rate of layer X [%] | 17.8 | 17.8 | 18.0 | 18.1 | 17.8 | 17.8 |
| | Filling rate of layer Z [%] | 16.7 | 15.0 | 12.1 | 11.7 | 12.1 | 15.0 |
| | Filling rate of layer Y [%] | 17.5 | 17.2 | 17.2 | 15.5 | 15.5 | 17.2 |
| | Filling rate ratio of layer X | 1.02 | 1.03 | 1.05 | 1.17 | 1.15 | 1.03 |
| | Filling rate ratio of layer Z | 0.95 | 0.87 | 0.70 | 0.75 | 0.78 | 0.87 |
| | Filling rate ratio of layer Y | 1 | 1 | 1 | 1 | 1 | 1 |
| | Filling rate of layer 1 [%] | 18.9 | 19.4 | 19.3 | 19.3 | 19.1 | 19.4 |
| | Filling rate of layer 2 [%] | 27.2 | 27.1 | 27.5 | 27.2 | 27.0 | 27.1 |
| | Filling rate of layer 3 [%] | 25.4 | 23.0 | 18.9 | 18.2 | 18.4 | 23.0 |
| | Filling rate of layer 4 [%] | 25.1 | 22.7 | 18.5 | 18.1 | 18.2 | 22.7 |
| | Average of filling rates of layer 3 and layer 4 [%] | 25.3 | 22.9 | 18.7 | 18.2 | 18.3 | 22.9 |
| | Filling rate of layer 5 [%] | 26.6 | 26.2 | 26.4 | 23.6 | 23.4 | 26.2 |
| | Filling rate of layer 6 [%] | 18.6 | 19.3 | 19.1 | 18.3 | 18.6 | 19.3 |
| | Filling rate ratio of layer 2 | 1.02 | 1.03 | 1.04 | 1.15 | 1.15 | 1.03 |
| | Average of filling rate ratios of layer 3 and layer 4 | 0.95 | 0.87 | 0.71 | 0.77 | 0.78 | 0.87 |

TABLE 1-continued

|  |  |  |  |  |  |  |  |
|---|---|---|---|---|---|---|---|
|  | Filling rate ratio of layer 5 | 1 | 1 | 1 | 1 | 1 | 1 |
|  | bending amount [%] | 4 | 4 | 5 | 7 | 4 | 4 |
|  | Volume ratio of pores with diameter of 50 to 100 μm [%] | 27 | 31 | 34 | 38 | 35 | 32 |
|  | Pore diameter peak [μm] | 42 | 39 | 41 | 43 | 40 | 41 |
|  | Sliding angle at surface Y [°] | 64 | 66 | 63 | 65 | 64 | 25 |
|  | Melting point hydrophobic material [° C.] | 329 | 330 | 331 | 330 | 329 | 309 |
| Microporous layer | Carbon powder A | 7.0 | 7.0 | 7.0 | 7.0 | 7.0 | 7.0 |
|  | Carbon powder B | — | — | — | — | — | — |
|  | Material C | 2.5 | 2.5 | 2.5 | 2.5 | 2.5 | 2.5 |
|  | Material D | 14 | 14 | 14 | 14 | 14 | 14 |
|  | Purified water | 75.8 | 75.8 | 75.8 | 75.8 | 75.8 | 75.8 |
| Gas diffusion electrode substrate | Areal weight [g/m$^2$] | 60 | 59 | 57 | 54 | 54 | 60 |
|  | Thickness [μm] | 171 | 169 | 169 | 170 | 171 | 169 |
| Anti-flooding characteristic | Output voltage [V] (operation condition: 40° C., humidification temperature: 40° C., humidity: 100%, current density: 1.5 A/cm$^2$) | 0.36 | 0.38 | 0.43 | 0.46 | 0.41 | 0.45 |

|  |  | Example 7 | Example 8 | Comparative Example 1 | Comparative Example 2 | Comparative Example 3 |
|---|---|---|---|---|---|---|
| Carbon Sheet | Thickness [μm] | 150 | 150 | 150 | 150 | 150 |
|  | Areal weight [g/m$^2$] | 45 | 50 | 51 | 45 | 45 |
|  | Mean diameter of monofilament (surface X/surface Y) [μm] | 7.0/7.0 | 7.0/7.0 | 7.0/7.0 | 7.0/7.0 | 7.0/7.0 |
|  | Type of hydrophobic material | PTFE | PTFE | PTFE | PTFE | PTFE |
|  | Filling rate of layer X [%] | 17.8 | 18.4 | 17.5 | 16.2 | 20.2 |
|  | Filling rate of layer Z [%] | 15.0 | 15.4 | 16.7 | 13.2 | 17.4 |
|  | Filling rate of layer Y [%] | 17.2 | 17.6 | 17.5 | 16.2 | 8.2 |
|  | Filling rate ratio of layer X | 1.03 | 1.05 | 1.00 | 1.00 | 2.46 |
|  | Filling rate ratio of layer Z | 0.87 | 0.88 | 0.95 | 0.81 | 2.12 |
|  | Filling rate ratio of layer Y | 1 | 1 | 1 | 1 | 1 |
|  | Filling rate of layer 1 [%] | 19.4 | 19.2 | 19.0 | 19.1 | 30.8 |
|  | Filling rate of layer 2 [%] | 27.1 | 27.5 | 26.8 | 24.3 | 28.1 |
|  | Filling rate of layer 3 [%] | 23.0 | 22.8 | 25.9 | 20.0 | 26.4 |
|  | Filling rate of layer 4 [%] | 22.7 | 22.7 | 25.6 | 19.9 | 18.5 |
|  | Average of filling rates of layer 3 and layer 4 [%] | 22.9 | 22.8 | 25.8 | 20.0 | 22.5 |
|  | Filling rate of layer 5 [%] | 26.2 | 26.5 | 26.8 | 24.3 | 11.1 |
|  | Filling rate of layer 6 [%] | 19.3 | 19.0 | 18.7 | 18.8 | 8.6 |
|  | Filling rate ratio of layer 2 | 1.03 | 1.04 | 1.00 | 1.00 | 2.53 |
|  | Average of filling rate ratios of layer 3 and layer 4 | 0.87 | 0.86 | 0.96 | 0.82 | 2.02 |
|  | Filling rate ratio of layer 5 | 1 | 1 | 1 | 1 | 1 |
|  | bending amount [%] | 4 | 8 | 2 | 2 | 14 |
|  | Volume ratio of pores with diameter of 50 to 100 μm [%] | 31 | 27 | 13 | 15 | 52 |
|  | Pore diameter peak [μm] | 39 | 34 | 40 | 42 | 47 |
|  | Sliding angle at surface Y [°] | 64 | 61 | 63 | 67 | 65 |
|  | Melting point hydrophobic material [° C.] | 329 | 328 | 331 | 332 | 328 |
| Microporous layer | Carbon powder A | — | 7.0 | 7.0 | 7.0 | 7.0 |
|  | Carbon powder B | 7.0 | — | — | — | — |
|  | Material C | 2.5 | 2.5 | 2.5 | 2.5 | 2.5 |
|  | Material D | 14 | 14 | 14 | 14 | 14 |
|  | Purified water | 75.8 | 75.8 | 75.8 | 75.8 | 75.8 |
| Gas diffusion electrode substrate | Areal weight [g/m$^2$] | 61 | 62 | 59 | 53 | 45 |
|  | Thickness [μm] | 172 | 170 | 171 | 169 | 168 |
| Anti-flooding characteristic | Output voltage [V] (operation condition: 40° C., humidification temperature: 40° C., humidity: 100%, current density: 1.5 A/cm$^2$) | 0.45 | 0.41 | 0.32 | 0.32 | 0.34 |

The invention claimed is:

1. A porous carbon sheet comprising a carbon fiber impregnated with a binding material, wherein, when among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to the one surface and has the largest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z, where the 50% filling rate is a value of 50% of an average value obtained in the following manner: the filling rate of the surface is measured every fixed length from the one surface to the other surface of the carbon sheet, and subsequently, an average value of the obtained filling rates of the surfaces is determined; and the filling rate of a layer is an average value obtained using the filling rates of the surfaces that form the layer, wherein, when the filling rate of the layer Y is 1, the filling rate of the layer X is 1.03 or more, and the filling rate of the layer Z is 0.97 or less.

2. The carbon sheet according to claim 1, wherein a sliding angle of water at a surface Y is 40 degrees or less where the surface Y is a surface closest to the layer Y.

3. The carbon sheet according to claim 1, wherein the carbon sheet has a thickness of 50 μm or more and 200 μm or less.

4. The carbon sheet according to claim 1, wherein the carbon sheet contains a hydrophobic material, and the melting point of the hydrophobic material is 200° C. or more and 320° C. or less.

5. A gas diffusion electrode substrate, wherein, when a surface closest to the layer X is a surface X, the gas diffusion electrode substrate has a microporous layer on the surface X side of the carbon sheet according to claim 1.

6. The gas diffusion electrode substrate according to claim 5, wherein the macroporous layer contains a carbon powder, and the carbon powder includes linear carbon having an aspect ratio of 30 to 5000.

7. A fuel cell comprising the gas diffusion electrode substrate according to claim 5.

8. A porous carbon sheet comprising a carbon fiber impregnated with a binding material, wherein, when among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to the one surface and has the largest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z, where the 50% filling rate is a value of 50% of an average value obtained in the following manner: the filling rate of the surface is measured every fixed length from the one surface to the other surface of the carbon sheet, and subsequently, an average value of the obtained filling rates of the surfaces is determined; and the filling rate of a layer is an average value obtained using the fillings rates of the surfaces that foiin the layer,
   wherein, when layers obtained by dividing the carbon sheet in a through-plane direction into six equal parts under compression at 0.15 MPa within a section extending from a surface to the other surface include a layer 1, a layer 2, a layer 3, a layer 4, a layer 5 and a layer 6 in this order from the layer including one surface to the layer including the other surface, a layer having the largest filling rate under compression at 0.15 MPa is the layer 2, and
   the filling rates of the layer 2, the layer 3, the layer 4 and the layer 5 under compression at 0.15 MPa satisfy a relationship of: filling rate of layer 2>filling rate of layer 5>average of filling rates of layer 3 and layer 4,
   wherein, when the filling rate of the layer 5 is 1, the filling rate of the layer 2 is 1.03 or more, and average of the filling rates of the layer 3 and the layer 4 is 0.97 or less.

9. A porous carbon sheet comprising a carbon fiber impregnated with a binding material, wherein, when layers obtained by dividing the carbon sheet in a through-plane direction into six equal parts under compression at 0.15 MPa within a section extending from a surface to the other surface include a layer 1, a layer 2, a layer 3, a layer 4, a layer 5 and a layer 6 in this order from the layer including one surface to the layer including the other surface, a layer having a largest filling rate under compression at 0.15 MPa is the layer 2, and
   filling rates of the layer 2, the layer 3, the layer 4 and the layer 5 under compression at 0.15 MPa satisfy a relationship of: filling rate of layer 2>filling rate of layer 5>average of filling rates of layer 3 and layer 4,
   wherein, when the filling rate of the layer 5 is 1, the filling rate of the layer 2 is 1.03 or more, and average of the filling rates of the layer 3 and the layer 4 is 0.97 or less.

10. The carbon sheet according to claim 9, wherein a sliding angle of water at a surface 6 is 40 degrees or less where the surface 6 is a surface included in the layer 6.

11. A gas diffusion electrode substrate, wherein, when a surface included in the layer 1 is a surface 1, the gas diffusion electrode substrate has a microporous layer on the surface 1 side of the carbon sheet according to claim 10.

12. A gas diffusion electrode substrate, wherein, when a surface included in the layer 1 is a surface 1, the gas diffusion electrode substrate has a microporous layer on the surface 1 side of the carbon sheet according to claim 9.

13. The gas diffusion electrode substrate according to claim 12, wherein the microporous layer contains a carbon powder, and the carbon powder includes linear carbon having an aspect ratio of 30 to 5000.

14. A fuel cell comprising the gas diffusion electrode substrate according to claim 12.

15. The carbon sheet according to claim 9, wherein a sliding angle of water at a surface 6 is 40 degrees or less where the surface 6 is a surface included in the layer 6.

16. A gas diffusion electrode substrate, wherein, when a surface included in the layer 1 is a surface 1, the gas diffusion electrode substrate has a microporous layer on the surface 1 side of the carbon sheet according to claim 9.

17. A porous carbon sheet comprising a carbon fiber impregnated with a binding material, wherein, when among layers obtained by dividing the carbon sheet in a through-plane direction into three equal parts within a section extending from a surface having a 50% filling rate, which is closest to one surface, to a surface having a 50% filling rate, which is closest to the other surface, a layer which is close to the one surface and has the largest layer filling rate is a layer X, a layer which is close to the other surface and has a layer filling rate smaller than that of the layer X is a layer Y, and a layer situated between the layer X and the layer Y is a layer Z, the filling rate decreases in the order of the layer X, the layer Y and the layer Z, where the 50% filling rate is a value of 50% of an average value obtained in the following manner: the filling rate of the surface is measured every fixed length from the one surface to the other surface of the carbon sheet, and subsequently, an average value of the obtained filling rates of the surfaces is determined and the filling rate of a layer is an average value obtained using the filling rates of the surfaces that form the layer,
   wherein, when the sum of volumes of pores having a pore diameter of 1 to 100 μm is 100%, the sum of volumes of pores having a pore diameter of 50 to 100 μm is 17 to 50%.

* * * * *